US011122041B2

(12) United States Patent
Hafernik

(10) Patent No.: US 11,122,041 B2
(45) Date of Patent: Sep. 14, 2021

(54) SYSTEM AND METHOD FOR LOCATION-BASED CREDENTIALING

(71) Applicant: Siemens Industry, Inc., Alpharetta, GA (US)

(72) Inventor: Robert Hafernik, Austin, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 477 days.

(21) Appl. No.: 14/865,914

(22) Filed: Sep. 25, 2015

(65) Prior Publication Data

US 2017/0093860 A1 Mar. 30, 2017

(51) Int. Cl.

| | |
|---|---|
| ***H04L 29/06*** | (2006.01) |
| ***H04W 4/02*** | (2018.01) |
| ***H04W 12/08*** | (2021.01) |
| ***G06F 21/35*** | (2013.01) |
| ***G06F 21/86*** | (2013.01) |

(Continued)

(52) U.S. Cl.

CPC .............. *H04L 63/10* (2013.01); *G06F 21/31* (2013.01); *G06F 21/35* (2013.01); *G06F 21/86* (2013.01); *G06F 21/88* (2013.01); *H04L 63/107* (2013.01); *H04W 4/023* (2013.01); *H04W 12/08* (2013.01); *H04W 12/63* (2021.01); *H04W 48/04* (2013.01)

(58) Field of Classification Search

CPC ....... H04L 63/10; H04L 63/107; G06F 21/31; G06F 21/35; G06F 21/88; G06F 21/2186; G06F 21/86; H04W 12/04; H04W 12/08

See application file for complete search history.

(56) References Cited

U.S. PATENT DOCUMENTS 5,451,757 A * 9/1995 Heath, Jr. ................. G07F 9/06 235/375
5,541,585 A * 7/1996 Duhame .................. G07C 9/28 340/5.62

(Continued)

FOREIGN PATENT DOCUMENTS

WO 2014124529 A1 8/2014

OTHER PUBLICATIONS

E. Androulaki, C. Soriente, L. Malisa and S. Capkun, "Enforcing Location and Time-Based Access Control on Cloud-Stored Data," 2014 IEEE 34th International Conference on Distributed Computing Systems, 2014, pp. 637-648. (Year: 2014).*

(Continued)

*Primary Examiner* — Kari L Schmidt

(57) ABSTRACT

Credentialing systems, methods, and mediums. A method includes receiving, by a credentialing system, an access code and a device location from a mobile device. The device location indicates the current geographic location of the mobile device. The method includes comparing the received access code to a stored site code. The method includes, when the received access code matches a stored site code, determining whether the device location corresponds to a site location of a target system associated with the site code, and determining whether the access code is received during a valid access period associated with the site code. The method includes, when the received access code matches the stored site code, the device location corresponds to the site location, and the access code is received during the valid access period, then granting access for the mobile device to the target system.

17 Claims, 4 Drawing Sheets

100

Credentialing Server 110

NETWORK 130

Building 120

Automation System 122

Mobile Device 140

(51) Int. Cl.

| | |
|---|---|
| ***G06F 21/88*** | (2013.01) |
| ***G06F 21/31*** | (2013.01) |
| *H04W 48/04* | (2009.01) |
| *H04W 12/63* | (2021.01) |

(56) References Cited

U.S. PATENT DOCUMENTS 6,553,375 B1 * 4/2003 Huang ...................... G06F 8/61
6,748,343 B2 * 6/2004 Alexander ............. H04L 41/22 340/541
7,196,610 B2 * 3/2007 Straumann ......... G07C 9/00015 340/10.1
8,290,877 B2 * 10/2012 Herwig ............. G06Q 30/0207 705/67
8,539,567 B1 * 9/2013 Logue ................ H04L 63/0884 709/223
8,706,588 B1 * 4/2014 Zhu ....................... G06Q 20/32 705/35
8,750,576 B2 * 6/2014 Huang .................... G06F 21/32 382/117
8,780,201 B1 * 7/2014 Scalisi .................. H04N 7/186 348/143
8,869,305 B1 * 10/2014 Huang ................. G06F 21/604 726/29
9,246,921 B1 * 1/2016 Vlaminck ............... H04L 63/10
9,444,805 B1 * 9/2016 Saylor ..................... H04L 63/08
9,462,041 B1 * 10/2016 Hagins .................... H04L 67/10
9,633,186 B2 * 4/2017 Ingrassia, Jr. ........... G06F 21/32
9,946,857 B2 * 4/2018 Beals .................... H04L 63/101
10,740,481 B2 * 8/2020 Lakhani .................. G06F 21/35
10,848,334 B2 * 11/2020 Rovito ................ H04L 41/0816
2004/0098595 A1 * 5/2004 Aupperle .............. H04L 63/083 713/185
2004/0121725 A1 * 6/2004 Matsui .................. G08C 17/02 455/3.06
2005/0188315 A1 * 8/2005 Campbell ............... G06F 21/32 715/742
2005/0228693 A1 * 10/2005 Webb ..................... G06Q 50/22 705/2
2006/0253894 A1 * 11/2006 Bookman ........... H04L 63/0428 726/2
2007/0004381 A1 * 1/2007 Larson .................... G06F 21/35 455/411
2009/0100260 A1 4/2009 Govindarajan
2010/0097225 A1 * 4/2010 Petricoin, Jr. ....... G07C 9/00111 340/573.1
2010/0269156 A1 * 10/2010 Hohlfeld ............. G06F 21/6218 726/4
2010/0283579 A1 * 11/2010 Kraus ................ G07C 9/00944 340/5.7
2011/0106708 A1 * 5/2011 Herwig .................. G06Q 10/10 705/50
2011/0187493 A1 * 8/2011 Elfstrom ................ G06Q 10/02 340/5.6
2011/0238234 A1 * 9/2011 Chen ........................ A62C 3/00 700/295
2012/0075059 A1 * 3/2012 Fyke ....................... G06F 21/35 340/5.21
2012/0164975 A1 * 6/2012 Dodeja ................. H04W 12/06 455/410
2012/0197806 A1 * 8/2012 Hill ......................... G06F 21/35 705/67
2012/0221150 A1 * 8/2012 Arensmeier ....... G05B 23/0224 700/276
2013/0141587 A1 * 6/2013 Petricoin, Jr. ....... G07C 9/00111 348/156
2013/0174273 A1 * 7/2013 Grab ....................... G06F 21/10 726/28
2013/0179926 A1 * 7/2013 White ................. H04L 12/2809 725/59
2014/0075493 A1 * 3/2014 Krishnan ................ G06F 21/31 726/1
2014/0089671 A1 * 3/2014 Logue ..................... H04L 63/08 713/182
2014/0201315 A1 * 7/2014 Jacob .................. H04L 12/2803 709/217
2014/0266684 A1 * 9/2014 Poder ................... G08B 25/003 340/521
2014/0292479 A1 10/2014 Ruckart
2014/0317005 A1 * 10/2014 Balwani ............. G06Q 10/0832 705/317
2015/0082225 A1 * 3/2015 Shearer ................. G06F 3/0482 715/771
2015/0097689 A1 * 4/2015 Logue .................... G08B 25/10 340/632
2015/0180708 A1 * 6/2015 Jacob .................. H04L 12/2803 709/224
2015/0192658 A1 * 7/2015 Ullah ........................ G01S 5/04 455/456.1
2015/0309487 A1 * 10/2015 Lyman ................ H04L 12/2827 700/275
2015/0365787 A1 * 12/2015 Farrell .................... H04W 4/02 455/456.1
2016/0109864 A1 * 4/2016 Lonn ................... H04L 12/2836 700/275
2016/0163138 A1 * 6/2016 Turner ............... G07C 9/00166 340/5.7
2016/0323548 A1 * 11/2016 Khot ................... G06F 3/04842
2016/0335423 A1 * 11/2016 Beals ...................... G06F 21/31

OTHER PUBLICATIONS

Bertino, Elisa, and Michael S. Kirkpatrick. "Location-based access control systems for mobile users: concepts and research directions." Proceedings of the 4th ACM SIGSPATIAL International Workshop on Security and Privacy in GIS and LBS. 2011, pp. 49-52. (Year: 2011).*

PCT Search Report dated Oct. 31, 2016, corresponding to PCT Application No. PCT/US2016/049610, 13 pages.

* cited by examiner

SYSTEM AND METHOD FOR LOCATION-BASED CREDENTIALING

TECHNICAL FIELD

The present disclosure is directed, in general, to automation systems and, more particularly, to credentialing of users in automation systems and other systems.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. Further, maintenance, auditing, and other activities often require access to on-site systems by occasional users that require credentials with limited access to specific sites during limited time periods.

SUMMARY OF THE DISCLOSURE

Various disclosed embodiments relate to systems and methods for location-based credentialing. A method includes receiving, by a credentialing system, an access code and a device location from a mobile device. The device location indicates the current geographic location of the mobile device. The method includes comparing the received access code to a stored site code. The method includes, when the received access code matches a stored site code, determining whether the device location corresponds to a site location of a target system associated with the site code, and determining whether the access code is received during a valid access period associated with the site code. The method includes, when the received access code matches the stored site code, the device location corresponds to the site location, and the access code is received during the valid access period, then granting access for the mobile device to the target system.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide login credentials to computer systems for intermittent or temporary users who are using the computer systems in conjunction with a particular physical location. For example, an HVAC repair technician may be dispatched to a particular customer site to fix an HVAC system and therefore require access to any HVAC automation systems. Disclosed embodiments can apply to any such location and system, referred to herein as a "site". Managing credentials for such access using conventional methods is expensive and time consuming and does not typically limit the credentials to the limited-time access required.

Figure 1:
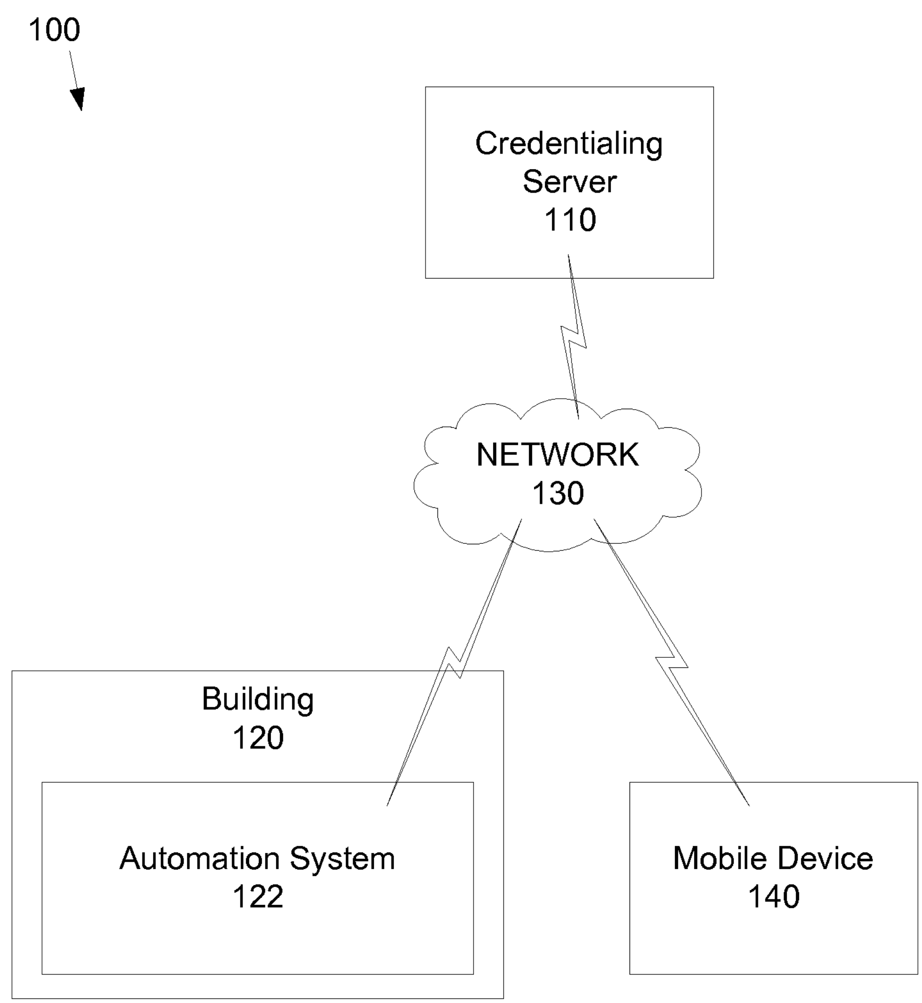
FIG. 1 illustrates a block diagram of a credentialing system in which various embodiments of the present disclosure are implemented.

FIG. 1 illustrates a block diagram of a credentialing system 100 in which various embodiments are implemented. In this illustrative embodiment, the credentialing system 100 includes a credentialing server 110 connected, via a network 130, to an automation system 122 disposed in or in proximity to a building 120. Such an automation system 114 can be an HVAC system, lighting system, security system, or any other system using credentialing processes as described herein. Credentialing server 110 may perform any number of other functions in addition to the credentialing functions described herein. For example, credentialing service 110 can also function as an overall management system for a plurality of automation systems 114.

The network 130 is a medium used to provide communication links between various data processing systems and other devices in the credentialing system 100. Network 130 may include any number of suitable connections, such as wired, wireless, or fiber optic links. Network 130 may be implemented as a number of different combinations of types of networks, such as, for example, the internet, a local area network (LAN), or a wide area network (WAN).

Mobile device 140 communicates over network 130 with automation system 122 and credentialing server 110. Mobile device 140 can be implemented as a smartphone, tablet computer, laptop computer, or other device that is configured to perform processes as described herein. In a typical implementation, mobile device 140 is used by a user that requires location-based credentials to access automation system 122 as described herein.

Figure 2:
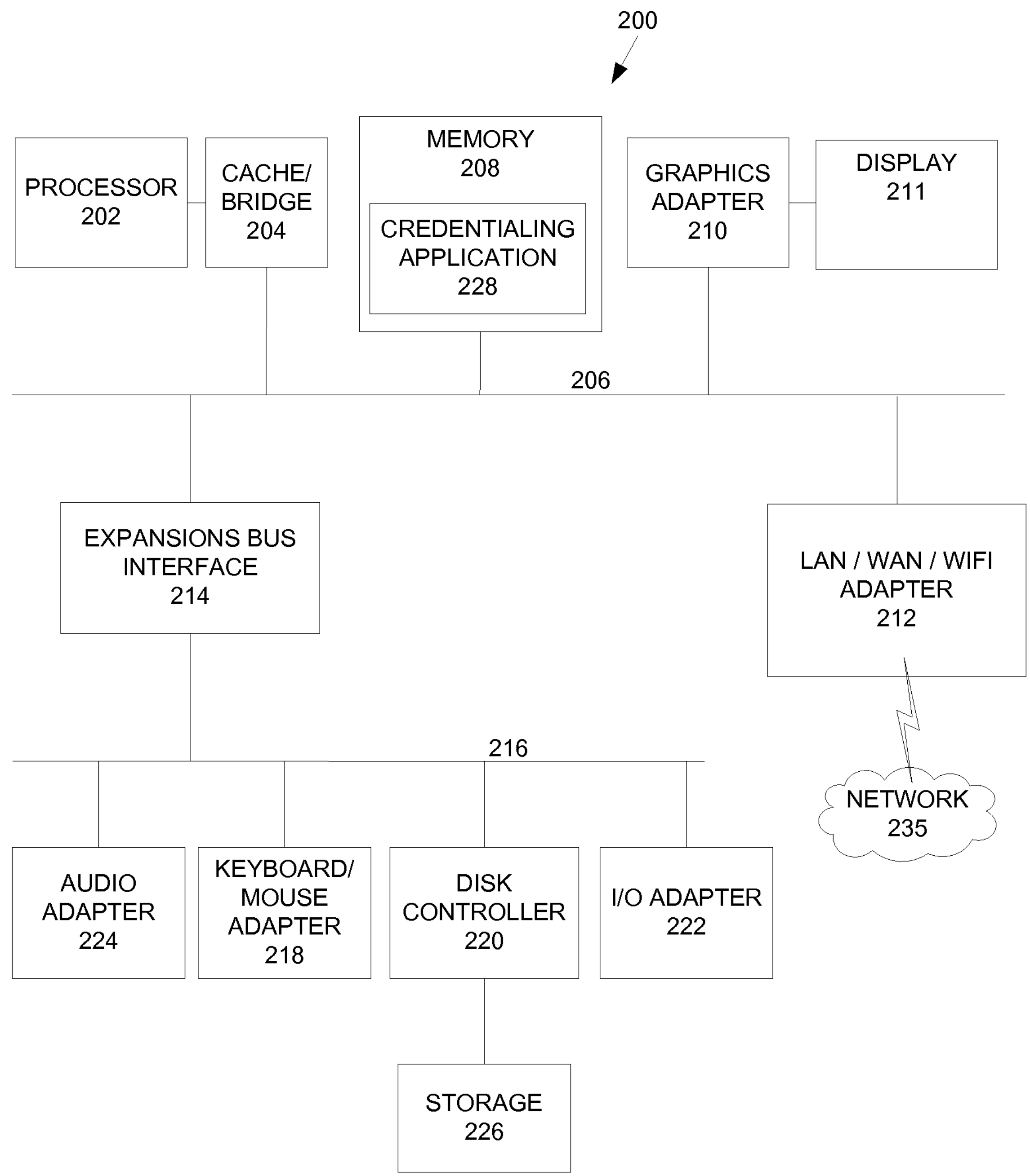
FIG. 2 depicts a block diagram of a data processing system in which various embodiments are implemented.

FIG. 2 depicts a block diagram of a data processing system 200 in which various embodiments are implemented. The data processing system 200 is an example of one implementation of the data processing system credentialing server 110 in FIG. 1, and such a data processing system can also be used to implement portions of automation system 122 or mobile device 140 in various embodiments.

The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211. Memory 208 can store an executable credentialing application 228 that causes the data processing system 200 to perform processes as described herein.

Other peripherals, such as a local area network (LAN)/Wide Area Network/Wireless (e.g. WiFi) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in connection with the display 211.

Those of ordinary skill in the art will appreciate that the hardware depicted in FIG. 2 may vary for particular implementations. For example, other peripheral devices, such as an optical disk drive and the like, also may be used in addition or in place of the hardware depicted. In other cases, for example when implementing mobile device 140, data processing system 200 may include a touchscreen input and a location device such as a global positioning system (GPS) receiver, and may be implemented in a portable form factor with integrated components. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., the Android operating system, or the iOS operating system may be employed. The operating system may modified or created in accordance with the present disclosure as described, for example, to implement the credentialing functions of one or more devices in a building.

LAN/WAN/Wireless adapter 212 may be connected to a network 235, such as network 130. As further explained below, the network 235 may be any public or private data processing system network or combination of networks, as known to those of skill in the art, including the Internet. Data processing system 200 may communicate over network 235 to one or more computers, which are also not part of data processing system 200, but may be implemented, for example, as a separate data processing system 200.

In some systems, a new username and password is created in the system and given permissions consistent with similar users of the computer system. Removing the user after the work is done is a job left to administrators who often do not know when it is time to revoke access to the system, or may simply neglect to do so. Administering many of these temporary users per day is impractical. Disclosed embodiments can provide location-based credentials that also have a time-limited validity.

Disclosed embodiments can instead use a "site code" in place of or in addition to conventional usual usernames and passwords. According to disclosed embodiments, the site code can be specific to the particular site to which the user needs access, such as using "geofencing" techniques that are specific to the physical location of the site such as by latitude and longitude or other location information. The site code can also be specific to the length of time for which access is needed (the "valid access period") and the level of permissions granted to the user to do perform their tasks (the "permissions"). General geolocation techniques are known to those of skill in the art. For example, geolocation is a part of the HTML5 standard, as implemented by most modern web browsers found in phones and other mobile devices.

When the site code is entered by the user, for example in to the mobile device 140, the credentialing server 110 grants access to the mobile device 140 only for the single site (the "target system" at the "target site") for which the credential was generated, only for a specified time period, and only if the user is physically located near the site. The user's permission level restricted to only those included in the credential.

For example, if a user of mobile device 140 requires access to automation system 122, mobile device 140 transmits the site code to the credentialing server 110. The site code may be entered by the user and received by mobile device 140, or may have been previously received by mobile device 140 from credentialing server 110 and stored in mobile device 140, or otherwise. The mobile device 140 also determines its own geographic location ("device location"), based on a GPS receiver or otherwise, and transmits the device location to the credentialing server 110.

The credentialing server 110 stores the geographic location of the automation systems 122 or other target system for which it manages credentials (the "site location"). The credentialing server 110 receives the site code and device location from the mobile device 140. The credentialing server validates the site code by determining whether it is a valid site code and the site location and valid access period associated with the site code.

If the site code is valid, the current time is within the valid access period, and the device location is in geographic proximity of the site location, then the mobile device 140 is given access to the automation system 122 or other target system at the access level defined by the permissions. The credentialing server 110 sends an authorization to the automation system 122. This access expires at the end of the valid access period, and the credentialing server 110 can sent a deauthorization to the automation system 122 at that time. Once authorized, the mobile device 140 can access automation system 122 through network 130 to perform any tasks authorized by the permissions.

In various embodiments, the site code can be generated by any authorized user (including a user associated with a customer's account) of the automation system 122, other target system, or credentialing server 110 for the temporary use of a temporary user. This is far cheaper than having high-level users of the computer system administering a username and password. In specific embodiments, the site code can automatically be generated when user access is the result of a computerized work order. Since the site code has a limited life, it will automatically be revoked, rather than requiring an administrator to revoke it. There is no worry that the credential might be disclosed or stolen by a third party because, in various embodiments, the credential is temporary, the access it grants is limited and the user (on a mobile device 140) must be physically present at the location to use it. The mobile device 140 itself does not have to be pre-authorized, as long as the user can use it to transmit the site code and the device location to the credentialing server 110.

Preferably, the site code is created from a large enough name space to make it practically impossible for a malicious user to guess it. Each side code is preferably used only a single time.

Disclosed embodiments provide significant advantages. It is far cheaper, using disclosed techniques, to grant access to temporary users; because the side code can be limited in permissions, time of use, and location, the side code presents a smaller security risk than traditional usernames and passwords.

Figure 3:
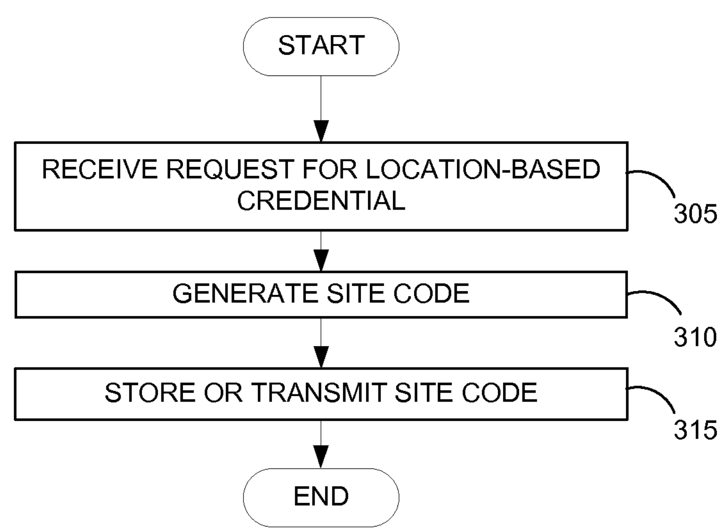
FIG. 3 illustrates depicts a flowchart of a process in accordance with disclosed embodiments.

FIG. 3 depicts a flowchart of a process for location-based credentialing in accordance with disclosed embodiments in particular for generating a site code as described herein. This process may be performed, for example, in one or more data processing systems, such as, for example, the data processing system 200, configured to perform acts described below, referred to in the singular as "the credentialing system," and which can act as the credentialing server described herein. The process may be implemented by executable instructions stored in a non-transitory computer-readable medium that cause one or more data processing systems to perform such a process. For example, the credentialing application 228 may comprise the executable instructions to cause one or more data processing systems to perform such a process, and can comprise a look-up table or other structure that stores site locations for one or more target sites.

The credentialing system receives a request for a location-based credential for access to target system at a target site (305). Such request can be received, for example, from the target system, from an authorized user of the target system, or the credentialing system or otherwise. The request can be, for example, an express request for such a location-based credential, a "trouble ticket" for service at the target site, a direct input into a user interface of the credentialing system, or otherwise. "Receiving," as used herein, can include loading from storing, receiving from another device or process, receiving via an interaction with a user, or otherwise. The request can include the identification of the target system, the identification of the target site, the site location of the target site, the level of access required on the target system, the valid access period of the access to the target system, or other data.

The credentialing system generates a site code corresponding to the request (310). As described herein, the site code functions as a location-based credential. Generating the site code includes storing the site code with site code data that corresponds to the request. The side code data can include any of the information in the request, and in particular can include the identification of the target site and the valid access period of the access to the target system. The credentialing system can store a many different site codes corresponding to different requests, target sites, levels of access, or access times.

The credentialing system stores the site code for later user (315). As part of storing the site code, the credentialing system can also transmit the site code to a user. The site code can be transmitted or delivered to the user using any suitable means, such as an email or text message or otherwise, or can be transmitted directly to and stored by a user's mobile device as described herein. The transmission can also take place at a later time, for example during the process of FIG. 4.

Figure 4:
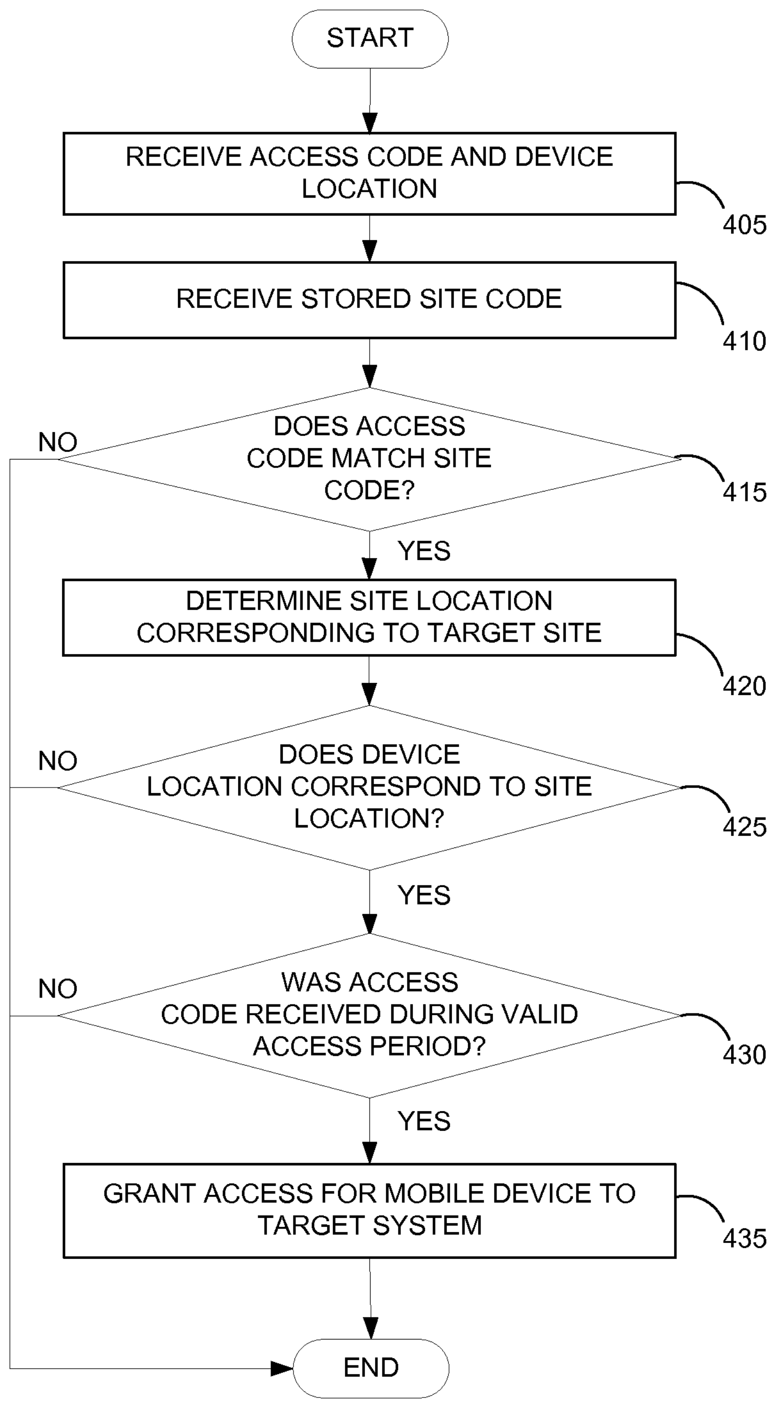
FIG. 4 depicts a flowchart of a process for location-based credentialing in accordance with disclosed embodiments.

FIG. 4 depicts a flowchart of a process for location-based credentialing in accordance with disclosed embodiments, in particular for using a site code as described herein or as may be generated by the process of FIG. 3. This process may be performed, for example, in one or more data processing systems, such as, for example, the data processing system 200, configured to perform acts described below, referred to in the singular as "the credentialing system," and which can act as the credentialing server described herein. The process may be implemented by executable instructions stored in a non-transitory computer-readable medium that cause one or more data processing systems to perform such a process. For example, the credentialing application 228 may comprise the executable instructions to cause one or more data processing systems to perform such a process, and can comprise a look-up table or other structure that stores site locations for one or more target sites.

The credentialing system receives an access code and a device location from a mobile device (405). The access code is typically received from the mobile device when the user of the mobile device is requesting access to the target system. The device location is the current location of the mobile device and can be, for example, GPS coordinates of the mobile device that are generated and transmitted by the mobile device. In specific embodiments, no username or password is received from the mobile device, since the access code (assuming it matches a site code) in conjunction with the device location provides the only authentication function necessary. Other information can be sent or received at this time, such as the identification of the target site, the site location of the target site, the level of access required on the target system, or other data, but in specific cases only the access code and device location is received.

The credentialing system receives the stored site code (410). In most implementations, the credentialing system simply retrieves the stored site code or accesses is look-up table or other structure that stores the site codes.

The credentialing system compares the received access code to the stored site code(s) (415). If there is no match, access is not granted and the process ends. If there is a match, the process proceeds. In any case where the authentication fails and access is not granted, the credentialing system can generate a suitable alert or take other action to indicate that a failed access attempt was made. In other cases, the credentialing system can accomplish processes 410 and 415 by performing a query or lookup in a lookup table, database, or other structure to see if the received access code matches any stored sited code.

The credentialing system can determine a site location corresponding to the target site (420). The site location can be determined from the request, can be determined by looking up the site location corresponding to the target site in a lookup table or other data structure, or can be determined by referencing a physical or mailing address of the target site and looking up the corresponding site location, or otherwise. The site location identifies the geographic location of the target site, and can be represented by GPS coordinates or otherwise. Determining the site location can be performed when generating the site code, when validating the received access code, or at another time. For example, in some cases, the credentialing system can have previously generated or stored the site locations associated with each target site, so that the site locations only have to be received or retrieved when needed.

The credentialing system determines whether the device location corresponds to the site location of the target system associated with the site code (425). The device location can be considered "corresponding" to the site location if, for example, it is within a certain distance threshold such as 100 yards or other distance or is otherwise at or very near the site location. If the device location does not correspond to the site location, access is not granted and the process ends. If the device location does correspond to the site location, the process proceeds.

The credentialing system determines whether the access code is received during the valid access period associated with the site code (430). The credentialing system can also perform any necessary conversions between the local time of the target site and the local time of the credentialing system or a uniform time system. If the access code is not received during the valid access period associated with the site code, access is not granted and the process ends. If the access code is received during the valid access period associated with the site code, the process proceeds.

The credentialing system grants access for the mobile device to the target system (435). The access is for the valid access period, and can be automatically revoked at the expiration of the valid access period. In different implementations, the credentialing system may transmit an access grant to the target system so that the mobile device can access the target system directly, or the credentialing system can itself interact with the mobile device to perform any tasks on the target system by acting as a gateway or "go-between" between the mobile device and the target system. The granted access corresponds to the level of access specified in the request for the location-based credential for access to the target system at a target site.

Of course, those of skill in the art will recognize that, unless specifically indicated or required by the sequence of operations, certain steps in the processes described above may be omitted, combined, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 or the other systems described herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

The description in the present application should not be read as implying that any particular element, step, or function is an essential or critical element which must be included in the claim scope: the scope of patented subject matter is defined only by the allowed claims. Moreover, none of these claims are intended to invoke 35 USC § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

What is claimed is:

1. A method performed by a credentialing system, comprising:

receiving, by the credentialing system, a request for a location-based credential for access to a target system at a target site, wherein the request includes an identification of the target system, an identification of the target site, a level of access required on the target system, and the valid access period;

in response to the request, generating and storing a site code by the credentialing system, the site code associated with the target system, the level of access, and the valid access period;

transmitting the site code to a user;

thereafter receiving, by the credentialing system, an access code and a device location from a mobile device, wherein the device location indicates the current geographic location of the mobile device;

comparing the received access code to the stored site code;

when the received access code matches the stored site code:

determining whether the device location corresponds to a site location of the target site, and determining whether the access code is received during the valid access period associated with the site code; and when the received access code matches the stored site code, the device location corresponds to the site location, and the access code is received during the valid access period, then granting access for the mobile device to access the target system and perform tasks according to the level of access.

2. The method of claim 1, further comprising:

determining the site location corresponding to the target site, wherein the site location identifies the geographic location of a target site corresponding to the target system.

3. The method of claim 1, wherein the device location corresponds to the site location when the device location is within a predetermined distance threshold of the site location.

4. The method of claim 1, wherein the granted access corresponds to the level of access specified in the request for the location-based credential for access to the target system at the target site.

5. The method of claim 1, wherein the credentialing system revokes the granted access at an expiration of the valid access period.

6. The method of claim 1, wherein the credentialing system does not receive a username or password with the received access code.

7. A credentialing system, comprising:

a storage device comprising a credentialing application;

an accessible memory comprising instructions of the credentialing application; and a processor configured to execute the instructions of the credentialing application to:

receive a request for a location-based credential for access to a target system at a target site, wherein the request includes an identification of the target system, an identification of the target site, a level of access required on the target system, and the valid access period;

in response to the request, generate and store a site code by the credentialing system, the site code associated with the target system, the level of access, and the valid access period;

transmit the site code to a user;

thereafter receive an access code and a device location from a mobile device, wherein the device location indicates the current geographic location of the mobile device;

compare the received access code to the stored site code;

when the received access code matches the stored site code:

determine whether the device location corresponds to a site location of the target site, and determine whether the access code is received during the valid access period associated with the site code; and when the received access code matches the stored site code, the device location corresponds to the site location, and the access code is received during the valid access period, then grant access for the mobile device to access the target system and perform tasks according to the level of access.

8. The credentialing system of claim 7, wherein the processor is further configured to execute the instructions of the credentialing application to determine the site location corresponding to the target site, wherein the site location identifies the geographic location of a target site corresponding to the target system.

9. The credentialing system of claim 7, wherein the device location corresponds to the site location when the device location is within a predetermined distance threshold of the site location.

10. The credentialing system of claim 7, wherein the granted access corresponds to the level of access specified in the request for the location-based credential for access to the target system at the target site.

11. The credentialing system of claim 7, wherein the credentialing system revokes the granted access at an expiration of the valid access period.

12. The credentialing system of claim 7, wherein the credentialing system does not receive a username or password with the received access code.

13. A non-transitory computer-readable medium encoded with executable instructions that, when executed, cause one or more data processing systems to:

receive a request for a location-based credential for access to a target system at a target site, wherein the request includes an identification of the target system, an identification of the target site, a level of access required on the target system, and the valid access period;

in response to the request, generate and store a site code by the credentialing system, the site code associated with the target system, the level of access, and the valid access period;

transmit the site code to a user;

thereafter receive an access code and a device location from a mobile device, wherein the device location indicates the current geographic location of the mobile device;

compare the received access code to the stored site code;

when the received access code matches the stored site code:

determine whether the device location corresponds to a site location of the target site, and determine whether the access code is received during the valid access period associated with the site code; and when the received access code matches the stored site code, the device location corresponds to the site location, and the access code is received during the valid access period, then grant access for the mobile device to access the target system and perform tasks according to the level of access.

14. The computer-readable medium of claim 13, wherein the computer-readable medium is further encoded with executable instructions that, when executed, cause one or more data processing systems to determine the site location corresponding to the target site, wherein the site location identifies the geographic location of a target site corresponding to the target system.

15. The computer-readable medium of claim 13, wherein the device location corresponds to the site location when the device location is within a predetermined distance threshold of the site location.

16. The computer-readable medium of claim 13, wherein the granted access corresponds to the level of access specified in the request for the location-based credential for access to the target system at the target site.

17. The computer-readable medium of claim 13, wherein the credentialing system revokes the granted access at an expiration of the valid access period.

* * * * *